United States Patent
Wang et al.

(10) Patent No.: US 12,271,077 B2
(45) Date of Patent: Apr. 8, 2025

(54) DISPLAY SUBSTRATE, CONTROL METHOD THEREOF, AND DISPLAY DEVICE

(71) Applicant: BOE Technology Group Co., Ltd., Beijing (CN)

(72) Inventors: Huijuan Wang, Beijing (CN); Xue Dong, Beijing (CN); Wanxian Xu, Beijing (CN); Zhenhua Lv, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/418,812

(22) PCT Filed: Dec. 28, 2020

(86) PCT No.: PCT/CN2020/140190
§ 371 (c)(1),
(2) Date: Sep. 30, 2021

(87) PCT Pub. No.: WO2021/190028
PCT Pub. Date: Sep. 30, 2021

(65) Prior Publication Data
US 2024/0111185 A1    Apr. 4, 2024

(30) Foreign Application Priority Data

Mar. 24, 2020   (CN) .......................... 202010212739.4

(51) Int. Cl.
*G02F 1/13357*    (2006.01)
*G02F 1/1335*    (2006.01)
(Continued)

(52) U.S. Cl.
CPC .. *G02F 1/133603* (2013.01); *G02F 1/133514* (2013.01); *G02F 1/133528* (2013.01);
(Continued)

(58) Field of Classification Search
CPC ........... G02F 1/13318; G02F 1/133553; G02F 1/133603; G09G 3/3406; G09G 3/3413;
(Continued)

(56) References Cited

U.S. PATENT DOCUMENTS

2005/0140902 A1    6/2005  Yang et al.
2015/0015146 A1*   1/2015  Kurita .................... H05B 45/20
                                                   315/152
(Continued)

FOREIGN PATENT DOCUMENTS

CN    103207490 A    7/2013
CN    105717688 A    6/2016
(Continued)

OTHER PUBLICATIONS

CN202010212739.4 first office action.
CN202010212739.4 second office action.

*Primary Examiner* — Priyank J Shah
(74) *Attorney, Agent, or Firm* — IPro, PLLC

(57) ABSTRACT

A display substrate includes: a first substrate, a second substrate, a liquid crystal layer, a plurality of pixel electrodes, and a plurality of light-emitting elements. The plurality of pixel electrodes and the plurality of light-emitting elements are both disposed on a side, proximal to the liquid crystal layer, of the first substrate.

19 Claims, 5 Drawing Sheets

(51) Int. Cl.
*G09G 3/34* (2006.01)
*G09G 3/36* (2006.01)

(52) U.S. Cl.
CPC ..... *G02F 1/133553* (2013.01); *G09G 3/3406* (2013.01); *G02F 1/1336* (2013.01); *G09G 3/36* (2013.01); *G09G 2320/0233* (2013.01); *G09G 2360/141* (2013.01); *G09G 2360/144* (2013.01)

(58) Field of Classification Search
CPC .... G09G 3/342; G09G 3/36; G09G 2360/141; G09G 2360/144; G09G 2354/00
See application file for complete search history.

(56) References Cited

U.S. PATENT DOCUMENTS

| | | |
|---|---|---|
| 2015/0179689 A1 | 6/2015 | Xie et al. |
| 2018/0033399 A1* | 2/2018 | Kawashima ........... H10K 59/50 |
| 2019/0132489 A1 | 5/2019 | Liao et al. |
| 2020/0172008 A1 | 6/2020 | Shidoh et al. |
| 2020/0257173 A1* | 8/2020 | Tsuchiya ............ G02F 1/133553 |
| 2021/0191174 A1* | 6/2021 | Li ..................... G02F 1/133553 |
| 2022/0147142 A1* | 5/2022 | Bui ..................... G06V 40/171 |

FOREIGN PATENT DOCUMENTS

| | | |
|---|---|---|
| CN | 107705767 A | 2/2018 |
| CN | 208225473 U | 12/2018 |
| CN | 109991779 A | 7/2019 |
| CN | 110047442 A | 7/2019 |
| CN | 110286509 A | 9/2019 |
| CN | 110632794 A | 12/2019 |
| CN | 110662671 A | 1/2020 |
| CN | 111258118 A | 6/2020 |
| EP | 2028640 A2 | 2/2009 |
| TW | 201816766 A | 5/2018 |

* cited by examiner

DISPLAY SUBSTRATE, CONTROL METHOD THEREOF, AND DISPLAY DEVICE

CROSS-REFERENCE TO RELATED APPLICATIONS

This application is a US national stage of international application No. PCT/CN2020/140190, filed on Dec. 28, 2020, which claims priority to Chinese Patent Application No. 202010212739.4, filed on Mar. 24, 2020 and entitled "DISPLAY SUBSTRATE, CONTROL METHOD THEREOF AND DISPLAY DEVICE," the disclosures of which are herein incorporated by reference in their entireties.

TECHNICAL FIELD

The present disclosure relates to the field of display technologies, and in particular, relates to a display substrate, a control method thereof, and a display device.

BACKGROUND

Reflective display substrates are widely used in e-books, wearable display devices, and outdoor display devices since they do not need an external light source and has advantages of saving power consumption and protecting eyes.

SUMMARY

The present disclosure provides a display substrate, a control method thereof, and a display device. The technical solutions are as follows.

In an aspect, a display substrate is provided. The display substrate includes:
a first substrate;
a second substrate disposed opposite to the first substrate;
a liquid crystal layer disposed between the first substrate and the second substrate;
a plurality of pixel electrodes disposed on a side, proximal to the liquid crystal layer, of the first substrate; and
a plurality of light-emitting elements disposed on the side, proximal to the liquid crystal layer, of the first substrate.

Optionally, the display substrate further includes:
a detection component disposed on a side, distal from the first substrate, of the second substrate and configured to detect an optical parameter of ambient light; and
a light source control circuit connected to the detection component and each of the light-emitting elements, and configured to control emission luminance of each of the light-emitting elements based on the optical parameter.

Optionally, the optical parameter includes a light intensity; the first substrate includes a display region and a peripheral region surrounding the display region;
the detection component includes: at least one first sensor disposed in the peripheral region, wherein each of the first sensor is configured to detect a first light intensity of the ambient light; and
the light source control circuit is configured to adjust the emission luminance of the light-emitting elements based on the first light intensity, wherein the adjusted emission luminance is negatively correlated with the first light intensity.

Optionally, the optical parameter further includes a color temperature; colors of light emitted by at least two of the plurality of light-emitting elements are different;

the detection component further includes: a plurality of second sensors disposed in the display region, wherein each of the second sensors is configured to detect a second light intensity of the ambient light and the color temperature of the ambient light; and
the light source control circuit is configured to adjust, based on the second light intensity and the color temperature detected by each of the second sensors, the emission luminance of the light-emitting elements of different colors in a region where the second sensors are disposed.

Optionally, the detection component is further configured to detect a user signal on a light emitting side of the display substrate; and
the light source control circuit is configured to control, based on the optical parameter, the emission luminance of each of the light-emitting elements in response to determining that a user is present at the light emitting side of the display substrate based on the user signal.

Optionally, the first substrate includes display region and a peripheral region surrounding the display region; and the detection component includes: a third sensor disposed in the peripheral region.

Optionally, at least two of the plurality of light-emitting elements emit light of different colors; and
the display substrate further includes: a color filter layer disposed on a side, proximal to the first substrate, of the second substrate, wherein the color filter layer includes a plurality of color resist blocks of different colors, an orthographic projection of each of the light-emitting elements on the first substrate is within an orthographic projection of one corresponding color resist block on the first substrate, and a color of light emitted by each of the light-emitting elements is the same as a color of the corresponding color resist block.

Optionally, the display substrate further includes:
a first polarizing layer, wherein the first polarizing layer is disposed on a side, distal from the first substrate, of the second substrate; and
a second polarizing layer disposed on a side, distal from the first substrate, of the plurality of light-emitting elements, wherein the second polarizing layer includes a plurality of polarizing patterns, and an orthographic projection of each of the polarizing patterns on the first substrate covers an orthographic projection of one of the light-emitting elements on the first substrate,
wherein a polarization direction of the second polarizing layer is perpendicular to a polarization direction of the first polarizing layer.

Optionally, an orthographic projection of each of the light-emitting elements on the first substrate is not overlapped with an orthographic projection of any one of the pixel electrodes on the first substrate.

Optionally, each of the light-emitting elements is a micro-light emitting diode.

Optionally, each of the pixel electrodes is a reflective electrode.

Optionally, the display substrate further includes:
a plurality of pixel circuits disposed on the first substrate, wherein each of the pixel circuits is connected to one of the pixel electrodes to supply a drive signal to the pixel electrode;
and an orthographic projection of each of the pixel circuits on the first substrate is within an orthographic projection of a pixel electrode connected thereto on the first substrate.

In another aspect, a control method of light-emitting elements in a display substrate is provided. The method is applied to control the light-emitting elements in the display substrate as defined in the aspect described above. The method includes:

detecting an optical parameter of ambient light in an environment where the display substrate is disposed; and controlling emission luminance of the light-emitting elements based on the optical parameter.

Optionally, the optical parameter includes a light intensity; the display substrate includes a first sensor; and controlling the emission luminance of the light-emitting elements based on the optical parameter includes:

adjusting, based on a first light intensity of the ambient light detected by the first sensor, the emission luminance of the light-emitting elements in response to determining that a user is present at a light emitting side of the display substrate, wherein the adjusted emission luminance is negatively correlated with the first light intensity; and keeping the light-emitting elements in an off state in response to determining that no user is present at the light emitting side of the display substrate.

Optionally, the optical parameter further includes a color temperature; the display substrate further includes a plurality of second sensors disposed in a display region; and controlling the emission luminance of the light-emitting elements based on the optical parameter further includes: adjusting, based on a second light intensity and the color temperature detected by each of the second sensors, the emission luminance of the light-emitting elements of different colors in a region where the second sensors are disposed.

Optionally, the display substrate further includes a third sensor; and the method further includes: determining, based on a user signal at the light emitting side of the display substrate detected by the third sensor, whether a user is present at the light emitting side of the display substrate.

Optionally, in response to the third sensor being a camera, determining, based on the user signal at the light emitting side of the display substrate detected by the third sensor, whether a user is present at the light emitting side of the display substrate includes:

acquiring an image captured by the third sensor;

determining, in response to the image containing a human face, that a user is present at the light emitting side of the display substrate; and determining, in response to the image not containing a human face, that no user is present at the light emitting side of the display substrate.

Optionally, in response to determining that a user is present at the light emitting side of the display substrate, the method further includes:

determining, in response to detecting that collimated light is present in the ambient light and a light intensity of the collimated light is greater than a light intensity threshold, a target region illuminated by light reflected by the pixel electrodes after the collimated light illuminates the pixel electrodes; and controlling, in response to determining that the user is present in the target region, the display substrate to display prompt information, wherein the prompt information is configured to remind the user to leave the target region.

In yet another aspect, a display device is provided. The display device includes: a drive circuit, and the display substrate described in the above aspect, wherein the drive circuit is configured to supply drive signals to a pixel circuits in the display substrate.

The technical solutions according to the present disclosure at least achieve the following beneficial effects.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following descriptions show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

In the related art, a reflective display substrate includes: a first substrate, a second substrate, a liquid crystal layer disposed between the first substrate and the second substrate, and a reflective layer disposed between the first substrate and the liquid crystal layer. External ambient light may be incident into the reflective layer via the second substrate. When the external ambient light is strong, the strong external ambient light can be reflected by the reflective layer to make the reflective display substrate emit light.

However, when the external ambient light is weak, the weak external ambient light is insufficient to be reflected by the reflective layer, such that the reflective display substrate may not emit light normally.

Figure 1:
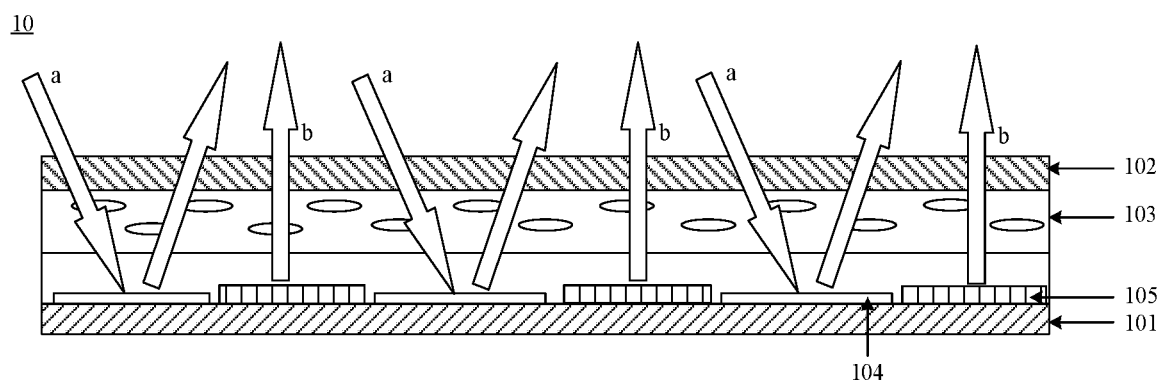
FIG. 1 is a schematic structural diagram of a display substrate according to an embodiment of the present disclosure.

FIG. 1 is a schematic structural diagram of a display substrate according to an embodiment of the present disclosure. Referring to FIG. 1, the display substrate 10 may include: a first substrate 101, a second substrate 102, a liquid crystal layer 103, a plurality of pixel electrodes 104, and a plurality of light-emitting elements 105.

The second substrate 102 may be disposed opposite to the first substrate 101; the liquid crystal layer 103 may be disposed between the first substrate 101 and the second substrate 102; and the plurality of pixel electrodes 104 may be disposed on a side, proximal to the liquid crystal layer 103, of the first substrate 101. The plurality of light-emitting elements 105 may be disposed on the side, proximal to the liquid crystal layer 103, of the first substrate 101. That is, both the plurality of pixel electrodes 104 and the plurality of light-emitting elements 105 may be disposed between the first substrate 101 and the liquid crystal layer 103.

In the embodiment of the present disclosure, the pixel electrodes 104 may be reflective electrodes for reflecting external ambient light. That is, the display substrate 10 may be a reflective display substrate. The plurality of light-emitting elements 105 may be auxiliary light sources for compensating for the external ambient light.

Since the plurality of light-emitting elements 105 are disposed on the side, proximal to the liquid crystal layer 103, of the first substrate 101, that is, the plurality of light-emitting elements 105 may be disposed in a liquid crystal cell (LC cell), light emitted by the plurality of light-emitting elements 105 does not leak from lateral sides of the second substrate 102, such that the display substrate 10 can achieve a better display effect. For example, the display substrate 10 may achieve a better display effect when displaying a pure black screen. Moreover, since the light emitted by the plurality of light-emitting elements 105 does not leak from lateral sides of the second substrate, the display substrate 10 may maintain a high contrast ratio (CR) when the external ambient light is weak and the light-emitting elements 105 emit light.

Optionally, both the first substrate 101 and the second substrate 102 may be glass substrates, and the second substrate 102 may be a transparent substrate. The external ambient light a may be incident to the pixel electrodes 104 from one side of the second substrate 102, the pixel electrodes 104 may reflect the ambient light, and then the reflected light is emitted after passing through the liquid crystal layer 103 and the second substrate 102 in sequence. Thus, the display substrate 10 may display images. Moreover, in the case of weak external ambient light, the light b emitted by the plurality of light-emitting elements 105 may also be emitted by passing through the liquid crystal layer 103 and the second substrate 102 in sequence, thereby compensating for the external ambient light and ensuring the display effect of the display substrate 10.

In summary, the embodiment of the present disclosure provides a display substrate to solve the problem that a reflective display substrate may not emit light normally due to weak external ambient light in the related art. The display substrate includes: a first substrate, a second substrate, a liquid crystal layer, a plurality of pixel electrodes, and a plurality of light-emitting elements. The plurality of pixel electrodes and the plurality of light-emitting elements are both disposed on a side, proximal to the liquid crystal layer, of the first substrate. When external ambient light is weak, the plurality of light-emitting elements in the display substrate may supply auxiliary light sources to the display substrate, such that the display substrate normally emits light, thereby ensuring a display effect. Moreover, since light emitted by the plurality of light-emitting elements may be directly emitted from the second substrate, the light emitted by the light-emitting elements can be prevented from leaking from lateral sides of the second substrate, thereby ensuring the display effect of the display substrate.

In the embodiment of the present disclosure, an orthographic projection of each of the light-emitting elements 105 on the first substrate 101 may not be overlapped with an orthographic projection of any one of the pixel electrodes 104 on the first substrate 101, whereby the pixel electrodes 104 and the light-emitting elements 105 may be prevented from influencing each other, and it is ensured that the display substrate 10 may display normally. Further, the orthographic projection of each of the light-emitting elements 105 on the first substrate 101 may also be overlapped with the orthographic projection of the pixel electrodes 104 on the first substrate 101, which is not limited in the embodiment of the present disclosure.

Optionally, the pixel electrodes 104 may be made of a metal material with reflective properties. For example, the pixel electrodes 104 may be made of aluminum (Al), magnesium (Mg), or silver (Ag). Each of the light-emitting elements 105 may be a micro light-emitting diode (micro-LED). Optionally, each of the light-emitting elements 105 may also be an organic light-emitting diode (OLED), and the type of the light-emitting element 105 is not limited in the embodiment of the present disclosure.

Figure 2:
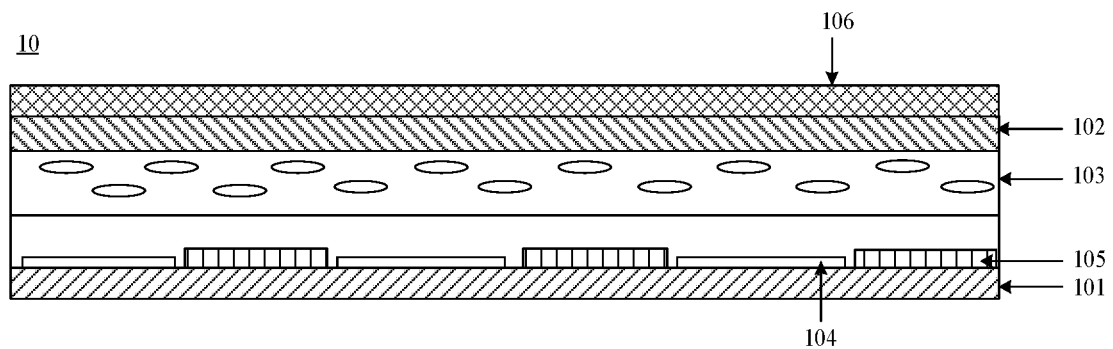
FIG. 2 is a schematic structural diagram of another display substrate according to an embodiment of the present disclosure.

FIG. 2 is a schematic structural diagram of another display substrate according to an embodiment of the present disclosure. Referring to FIG. 2, the display substrate 10 may further include: a detection component 106 and a light source control circuit (not shown in FIG. 2). The detection component 106 may be disposed on a side, distal from the first substrate 101, of the second substrate 102, and configured to detect an optical parameter of the ambient light. The light source control circuit may be connected to the detection component 106 and each of the light-emitting elements 105 respectively, and is configured to control emission luminance of each of the light-emitting elements 105 based on the optical parameter. The optical parameter may include a light intensity and a color temperature. The light intensity may be applied to represent the intensity of light. The color temperature may be applied to represent color components of the external ambient light.

In the embodiment of the present disclosure, the detection component 106 may also be configured to detect a user signal on a light emitting side of the display substrate 10. The light source control circuit may be configured to determine, based on the user signal detected by the detection component 106, whether a user is present at the light emitting side of the display substrate 10. In response to determining, based on the user signal, that a user is present at the light emitting side of the display substrate 10, the emission luminance of each of the light-emitting elements 105 is controlled based on the optical parameter.

Where it is determined, based on the user signal detected by the detection component 106, that a user is present at the light emitting side of the display substrate 10, the user is using the display substrate 10 to view information. In this case, the light source control circuit may control the emission luminance of each of the light-emitting elements 105 based on the optical parameter of the ambient light. Where it is determined, based on the user signal detected by the detection component 106, that no user is present at the light emitting side of the display substrate 10, the user is not using the display substrate 10 to view information. In this case, it is unnecessary for the light source control circuit to control the emission luminance of each of the light-emitting elements 105 based on the optical parameter of the ambient light. That is, the light source control circuit may control the light-emitting elements 105 to be in an off state. That is, the light-emitting elements 105 do not emit light, thereby keeping a low power consumption.

Further, in response to a user being present at the light emitting side of the display substrate 10 and the external ambient light being weak, the light source control circuit may control the light-emitting elements 105 to emit light with high luminance, thereby ensuring that the display substrate 10 may display normally. In response to a user being present at the light emitting side of the display substrate 10 and the external ambient light being strong, which means that the external ambient light is sufficient to ensure the normal display of the display substrate 10, the light source control circuit may control the light-emitting element 105 to be in the off state to reduce the power consumption.

Figure 3:
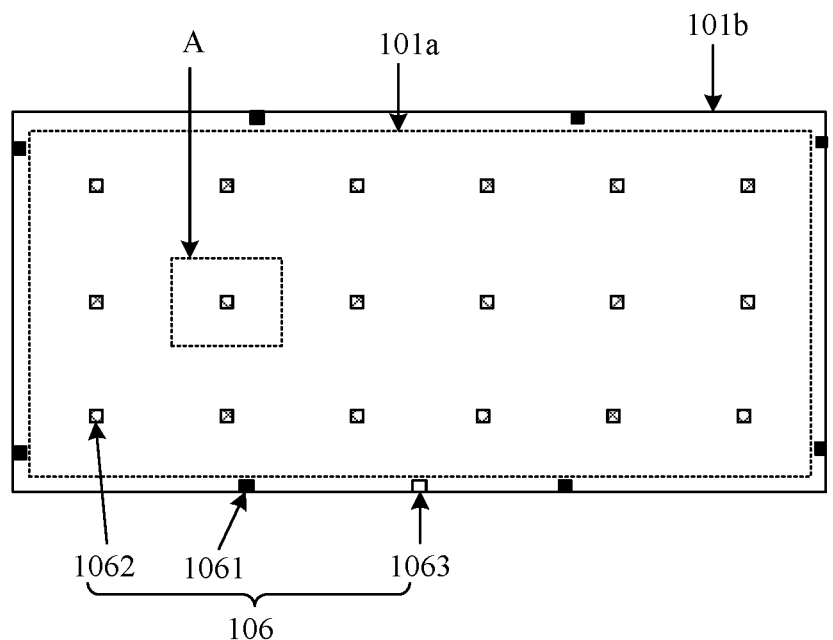
FIG. 3 is a top view of a display substrate according to an embodiment of the present disclosure.

FIG. 3 is a top view of a display substrate according to an embodiment of the present disclosure. Referring to FIG. 3, the detection component 106 may include: first sensors 1061, second sensors 1062 and a third sensor 1063. The first sensors 1061 may be configured to detect a first light intensity of the ambient light. The second sensors 1062 may be configured to detect a second light intensity and a color temperature of the ambient light. The third sensor 1063 may be configured to detect a user signal at the light emitting side of the display substrate 10.

Referring to FIG. 3, the detection component 106 may include: at least one first sensor 1061, a plurality of second sensors 1062 and a third sensor 1063. The first substrate 101 may include a display region 101a and a peripheral region 101b surrounding the display region 101a. The at least one first sensor 1061 and the third sensor 1063 may be disposed in the peripheral region 101b, and the plurality of second sensors 1062 may be disposed in the display region 101a. Moreover, the light source control circuit may also be disposed in the peripheral region 101b.

Optionally, referring to FIG. 3, the detection component 106 may include a plurality of first sensors 1061, which may be evenly distributed in the peripheral region 101b. The plurality of second sensors may be arranged in an array in the display region 101a.

Referring to FIG. 3, the detection component 106 may include one third sensor 1063. The one third sensor 1063 is disposed below the display region 101a; or, the one third sensor 1063 may be disposed above the display region 101a, which is not limited in the embodiment of the present disclosure. Further, the display substrate 10 may also include two or more third sensors 1063. The accuracy of determining, by the light source control circuit, whether a user is present at the light emitting side of the display substrate 10 may be improved by arranging a plurality of third sensors 1063 in the display substrate 10.

Optionally, the third sensor 1063 may be a camera, and may be configured to capture an image. That is, the user signal may include an image. Where the light source control circuit determines, based on the image, that the image contains a human face, it can be determined that a user is present at the light emitting side of the display substrate 10. If the light source control circuit determines, based on the image, that the image dose not contain a human face, it can be determined that no user is present at the light emitting side of the display substrate 10.

Or, the third sensor 1063 may also be other devices for detecting the user signal at the light emitting side of the display substrate 10. For example, the third sensor 1063 may be a distance sensor, and the third sensor 1063 may be configured to detect a distance between a user and the display substrate 10. That is, the user signal may include a distance. Further, where a plurality of third sensors 1063 are disposed in the display substrate 10, all of the plurality of third sensors 1063 may be the cameras, or the distance sensors; or one part of the third sensors 1063 may be the cameras, and the other part of the third sensors 1063 may be the distance sensors.

It should be noted that the number of the first sensors and the number of the second sensors, included in the display substrate 10, may be determined according to the desired accuracy of the detected optical parameter; and the number of the third sensors may be determined according to the detection accuracy required to detect the presence of a user. The higher the required accuracy is, the greater the number of the sensors included in the display substrate is; and the lower the required accuracy is, the smaller the number of the sensors included in the display substrate 10 is.

In the embodiment of the present disclosure, colors of light emitted by at least two of the plurality of the light-emitting elements 105 are different. Since at least two light-emitting elements 105 emit light of different colors, and the emitted light is of high color purity and small full width at half maxima, such that, in the case where the external ambient light is weak and the light-emitting elements 105 emit light, the display substrate 10 may display diverse colors and achieve high color gamut. For example, the color gamut of the display substrate 10 according to the embodiment of the present disclosure may reach more than 85% of the color gamut specified by the color standard Rec. 2020.

Optionally, the color of the light emitted by each of the light-emitting elements 105 may be red (R), green (G), or blue (B). Moreover, since the plurality of light-emitting elements 105 are disposed in the liquid crystal cell, and the light emitted by each of the light-emitting elements 105 may be directly emitted from the second substrate 102 without being reflected, such that the cross color problems between the adjacent light-emitting elements 105 may be avoided.

In the embodiment of the present disclosure, each first sensor 1061 may be configured to detect the first light intensity of the ambient light. The light source control circuit may be configured to adjust the emission luminance of the light-emitting element 105 based on the first light intensity, wherein the adjusted emission luminance may be negatively correlated with the first light intensity.

That is, the stronger the first light intensity of the ambient light detected by the first sensor 1061 is, the weaker the emission luminance of the light-emitting elements 105 can be controlled by the light source control circuit. The weaker the first light intensity of the ambient light detected by the first sensor 1061 is, the stronger the emission luminance of the light-emitting elements 105 can be controlled by the light source control circuit.

In the embodiment of the present disclosure, a first threshold and a second threshold may be pre-stored in the light source control circuit, wherein the second threshold is smaller than the first threshold. Where the first light intensity of the ambient light, detected by the first sensor 1061 is greater than or equal to the first threshold, the external ambient light may ensure the normal display of the display substrate 10 without the need of emitting light by the light-emitting elements 105, and therefore, the light source control circuit may control the light-emitting elements 105 to be in the off state.

Where the first light intensity of the ambient light detected by the first sensor 1061 is greater than or equal to the second threshold and less than the first threshold, the external ambient light is insufficient to ensure the normal display of the display substrate 10, and therefore, the light source control circuit may control the light-emitting elements 105 to emit light to compensate for the external ambient light, thereby ensuring the normal display of the display substrate 10.

Where the first light intensity of the ambient light detected by the first sensor 1061 is less than the second threshold, the external ambient light is very weak (for example, the ambient light illuminating the display substrate 10 is almost 0), and therefore, the light source control circuit may control the light-emitting elements 105 to emit strong light to ensure normal display of the display substrate 10. The light source control circuit in the embodiment of the present disclosure may adjust, based on the first light intensity detected by the first sensor 1061, the emission luminance of the light-emitting elements 105, such that the utilization rate of the external ambient light and the light-emitting elements 105 can be improved to nearly 100%. As a result, the display substrate can maintain a low power consumption.

It should be noted that each of second sensors 1062 may be configured to detect the second light intensity of the ambient light and the color temperature of the ambient light. The light source control circuit may be configured to adjust, based on the second light intensity and the color temperature detected by each of the second sensors 1062, the emission luminance of the light-emitting elements 105 of different colors in a region A where the second sensors 1062 are disposed.

In the embodiment of the present disclosure, the light source control circuit may adjust, based on the second light intensity detected by the second sensors 1062 disposed in different regions of the display substrate 10, the emission luminance of the light-emitting elements 105 disposed in different regions of the display substrate 10, thereby ensuring the luminance uniformity of the display substrate 10. Moreover, the adjusted emission luminance of the light-emitting element 105 in a region is negatively correlated with the second light intensity detected by the second sensor 1062 in this region. That is, the higher the second light intensity detected by the second sensor 1062 in a region, the lower the emission luminance of the light-emitting element 105 in this region. The lower the second light intensity detected by the second sensor 1062 in a region, the higher the emission luminance of the light-emitting element 105 in this region.

As an example, assuming that the luminance detected by the second sensor 1062 in a region of the display substrate 10 is lower than the luminance detected by the second sensors 1062 in other regions, then the light source control circuit may increase the emission luminance of the light-emitting element 105 in this region. Assuming that the luminance detected by the second sensor 1062 in a region of the display substrate 10 is higher than the luminance detected by the second sensors 1062 in other regions, then the light source control circuit may decrease the emission luminance of the light-emitting element 105 in this region.

In the embodiment of the present disclosure, the light source control circuit may also adjust the emission luminance of the light-emitting elements 105 of different colors based on the color temperature of the ambient light, such that the display substrate 10 may display a more appropriate color in any external environment, thereby improving the user experience.

Optionally, with respect to the light-emitting elements of any color in the region where each of the second sensors 1062 is disposed, when the light source control circuit adjusts the emission luminance of the light-emitting elements of any color, a component level of the light of any color in the ambient light may be determined based on the color temperature detected by the second sensor 1062, such that the emission luminance of the light-emitting element of any color can be adjusted based on the component level of the light of any color. Moreover, the adjusted emission luminance is negatively correlated with the component level of the light of any color in the ambient light. That is, the higher the component level of the light of any color in the ambient light is determined based on the color temperature, the lower the emission luminance of the light-emitting element 105 of any color is; and the lower the component level of the light of any color in the ambient light is determined based on the color temperature, the higher the emission luminance of the light-emitting element 105 of any color is.

As an example, assuming that in an external environment, the light source control circuit determines, based on the color temperature detected by the second sensor 1062 in a region, that the component level of yellow light in the ambient light in this region is higher, then the light source control circuit may decrease the luminance of the light-emitting elements 105 that are configured to emit yellow light (i.e., yellow light-emitting elements 105) in this region, and increase the luminance of the light-emitting elements 105 that are configured to emit light of other colors in this region. In another external environment, the light source control circuit determines, based on the color temperature detected by the second sensor 1062 in a region, that the component level of green light in the ambient light in this region is higher; then the light source control circuit may decrease the luminance of the light-emitting elements 105 that are configured to emit green light (i.e., green light-emitting elements 105) in this region, and increase the luminance of the light-emitting elements 105 that are configured to emit light of other colors in this region.

Figure 4:
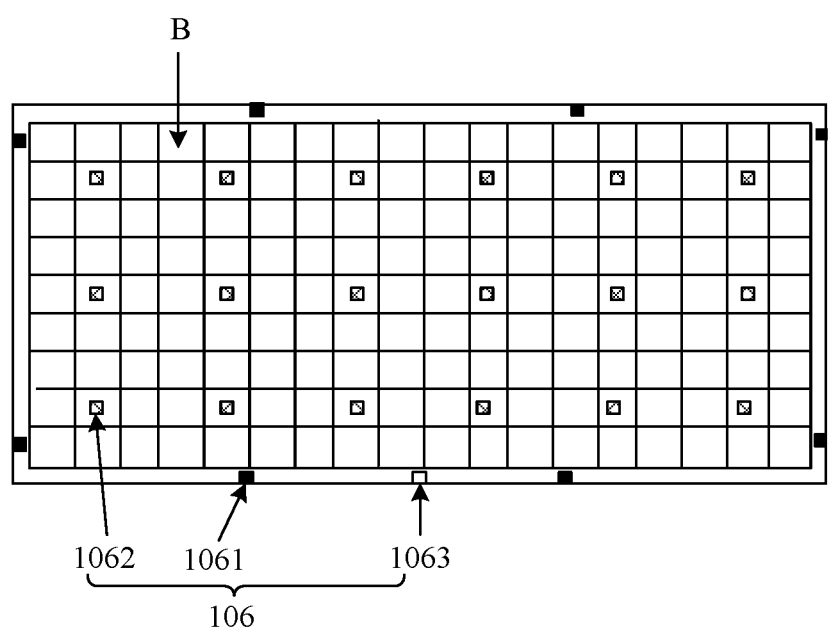
FIG. 4 is a top view of another display substrate according to an embodiment of the present disclosure.

FIG. 4 is a top view of another display substrate according to an embodiment of the present disclosure. Referring to FIG. 4, the display region 101a of the first substrate 101 may include a plurality of pixel regions B. Each of the pixel regions B may refer to a region where one pixel in the display region 101a is disposed. Each of the second sensors 1062 may be disposed in one pixel region B. Each of the second sensors 1062 may be configured to detect the second light intensity and the color temperature of the ambient light in a pixel region where it is disposed and pixel regions adjacent to the pixel region where it is disposed.

Figure 5:
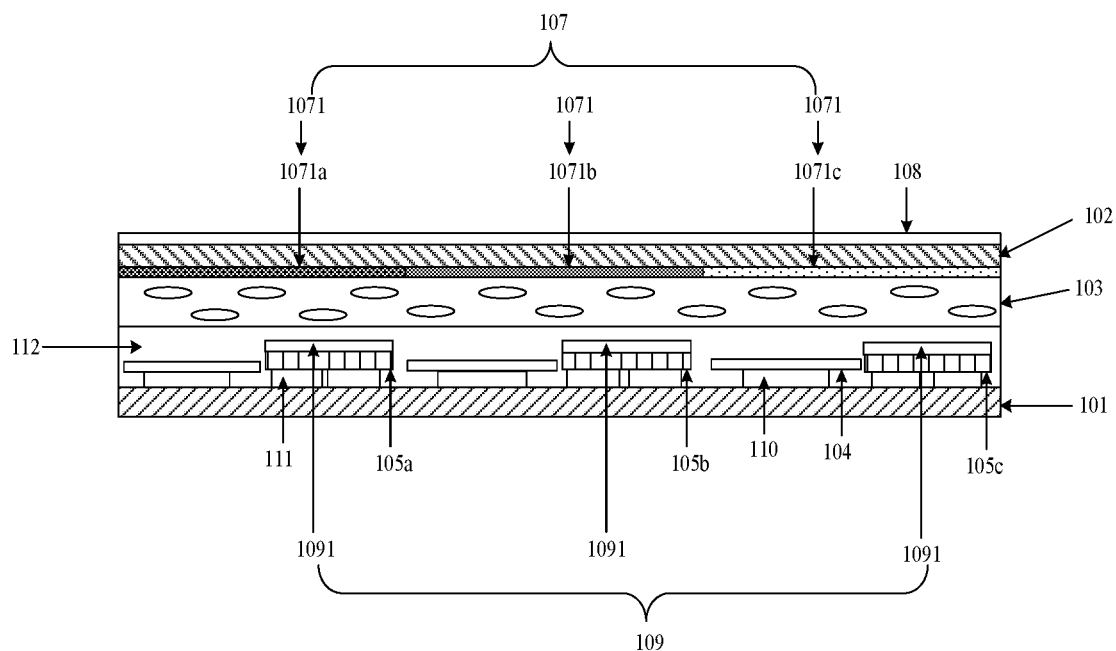
FIG. 5 is a schematic structural diagram of yet another display substrate according to an embodiment of the present disclosure.

FIG. 5 is a schematic structural diagram of yet another display substrate according to an embodiment of the present disclosure. Referring to FIG. 5, the display substrate 10 may further include: a color filter layer 107. The color filter layer 107 may be disposed on the side of the second substrate 102 proximal to the first substrate 101. The color filter layer 107 may include a plurality of color resist blocks 1071 of different colors; an orthographic projection of each of the light-emitting elements 105 on the first substrate 101 is within an orthographic projection of one corresponding color resist block 1071 on the first substrate 101; and the color of the light emitted by each of the light-emitting elements 105 may be the same as the color of the corresponding color resist block 1071.

As an example, FIG. 5 shows three light-emitting elements 105 and three color resist blocks 1071. The color of light emitted by a first light-emitting element 105a and the color of a first color resist block 1071a are both blue. The color of light emitted by a second light-emitting element 105b and the color of a second color resist block 1071b are both green; and the color of light emitted by a third light-emitting element 105c and the color of a third color resist block 1071c are both red.

In the embodiment of the present disclosure, in the case where the external ambient light is strong and the light-emitting elements 105 do not emit light, the display substrate 10 may display an image relying on the pixel electrodes 104 reflecting the external ambient light. However, the ambient light per se does not appear to be of a color. Therefore, a color filter layer 107 may be disposed in the display substrate 10 to enable the display substrate 10 to display an image of diverse colors, wherein the color filter layer 107 may be configured to transform the ambient light into light of a color. For example, assuming that the color of a color resist block 1071 is red, then the color resist block 1071 may transform the ambient light into red light.

It should be noted that the color of light emitted by a light source in a display substrate in the related art is white. In order to enable the display substrate to display diverse colors, the light emitted by the light source needs to pass through the color resist block 1071 for color conversion, thereby resulting in low luminous efficacy of the light source. In the embodiment of the present disclosure, since each of the light-emitting elements 105 may emit light with a color, and the color of the light emitted by the light-emitting element 105 is the same as the color of a corresponding color resist block 1071, the light emitted by the light-emitting element 105 may be directly transmitted through the color resist block 1071, resulting in high utilization rate and high luminous efficacy of the light source. In general, the light source utilization rate of the light-emitting elements 105 in the display substrate according to the embodiment of the present disclosure may be increased by at least 65% compared with the related art, and the luminous efficacy may be 3 to 4 times that of the related art.

Referring to FIG. 5, the display substrate 10 may further include: a first polarizing layer 108 and a second polarizing layer 109. The first polarizing layer 108 may be disposed on the side, distal from the first substrate 101, of the second substrate 102. The second polarizing layer 109 may be disposed on the side, distal from the first substrate 101, of the plurality of light-emitting elements 105. The second polarizing layer 109 may include a plurality of polarizing patterns 1091, wherein an orthographic projection of each of the polarizing patterns 1091 on the first substrate 101 covers the orthographic projection of one of the light-emitting elements 105 on the first substrate 101. A polarization direction of the second polarizing layer 109 is perpendicular to a polarization direction of the first polarizing layer 108.

Moreover, referring to FIG. 5, the display substrate 10 may further include: a plurality of pixel circuits 110 disposed on the first substrate 101. Each of the pixel circuits 110 is connected to one pixel electrode 104, and configured to supply a drive signal to the pixel electrode 104. Under the control of the drive signal, the pixel electrode 104 can drive liquid crystal to deflect. An orthographic projection of each of the pixel circuits 110 on the first substrate 101 may be within the orthographic projection of the pixel electrode 104 connected thereto on the first substrate 101, to avoid the pixel circuit 110 affecting the reflection of the ambient light by the pixel electrode 104.

It should be noted that the external ambient light may be transformed into polarized light after passing through the first polarizing layer 108; the polarized light illuminates the pixel electrodes 104 and then is reflected by the pixel electrodes 104 to the liquid crystal layer 103; and liquid crystal molecules in the liquid crystal layer 103 may deflect under the drive of the pixel circuits 110, such that the polarized light reflected by the pixel electrodes 104 to the liquid crystal layer 103 may be transmitted through the first polarizing layer 108. The light emitted by the light-emitting elements 105 may be transformed into polarized light after passing through the second polarizing layer 109. The polarized light is deflected after passing through the liquid crystal layer 103 so as to be transmitted through the first polarizing layer 108, such that the display substrate 10 may display an image.

Further, the display substrate 10 may not include the second polarizing layer 109 either. In this case, the light emitted by the light-emitting elements 105 is not transformed into polarized light before passing through the liquid crystal layer 103, and therefore, the light-emitting elements 105 may only supply auxiliary light sources to the display substrate 10. That is, the display substrate 10 may include only one first polarizing layer 108 that is disposed on the side, distal from the first substrate 101, of the second substrate 102. As a result, the display substrate 10 has a simple structure and maintains a low power consumption.

Optionally, the first polarizing layer 108 and the second polarizing layer 109 may be polarizers (POLs) or wire grating polarizers (WGPs). The wire grating polarizer may be manufactured by a semiconductor photolithography process or a nanoimprint process, which may be compatible with a manufacturing process of the light-emitting elements 105.

Referring to FIG. 5, the display substrate 10 may further include: a plurality of light emitting circuits 111 connected to the plurality of light-emitting elements 105 in one-to-one correspondence. Each of the light emitting circuits 111 may be configured to drive one light-emitting element 105 connected thereto to emit light. The plurality of light emitting circuits 111 may be disposed on the first substrate 101, and may be disposed on a same layer as the plurality of pixel circuits 110.

It should be noted that the light-emitting elements 105 may operate in a drive mode of active matrix (AM), passive matrix (PM), or on/off mode. When operating in the drive mode of active matrix, each of the light-emitting elements 105 includes a corresponding light-emitting circuit thereof, and a drive current may be supplied by a drive transistor in the light emitting circuit. When operating in the drive mode of passive matrix, an anode of each column of the light-emitting elements in the display substrate 10 is connected to a column scan line, and a cathode of each row of the light-emitting elements is connected to a row scan line. If the scan line of a $Y^{th}$ column and the scan line of an $X^{th}$ row are gated, the light-emitting element at an intersection (X, Y) may emit light. When operating in the on/off driving mode, the emission luminance of each of the light-emitting elements is fixed when the light-emitting elements emit light. That is, the light source control circuit may control the light-emitting element to be in an off state or control the light-emitting element to emit light with fixed luminance.

Still referring to FIG. 5, the display substrate 10 may further include: a planarization layer 112. The planarization layer may be disposed on a side, distal from the first substrate 101, of the plurality of light-emitting elements 105.

It should be noted that a process for manufacturing the display substrate 10 may include the following processes.

In process 51, a plurality of pixel circuits and a plurality of pixel electrodes are formed on a side of a first substrate.

Moreover, when the plurality of pixel electrodes are formed, a region needs to be reserved between every two adjacent pixel electrodes. That is, a gap is provided between each two adjacent pixel electrodes.

In process S2, a plurality of light-emitting elements are transferred to the first substrate by a mass transfer process, wherein each of the light-emitting elements is disposed between two adjacent pixel electrodes.

In process S3, a planarization layer and a liquid-crystal alignment layer are coated in sequence on the side, distal from the first substrate, of the light-emitting elements.

In process S4, a color filter layer is formed on a side of a second substrate.

In process S5, a liquid-crystal alignment layer is coated on a side, distal from the second substrate, of the color filter layer.

In process S6, the first substrate (an array substrate), including the light-emitting elements, and the second substrate (a color filter substrate) are oppositely arranged to form a cell to obtain the display substrate according to the embodiment of the present disclosure.

In summary, the embodiment of the present disclosure provides a display substrate. The display substrate includes: a first substrate, a second substrate, a liquid crystal layer, a plurality of pixel electrodes, and a plurality of light-emitting elements. The plurality of pixel electrodes and the plurality of light-emitting elements are both disposed on a side, proximal to the liquid crystal layer, of the first substrate. When external ambient light is weak, the plurality of light-emitting elements in the display substrate may supply auxiliary light sources to the display substrate, such that the display substrate normally emits light to ensure a display effect. Moreover, since light emitted by the plurality of light-emitting elements may be directly emitted from the second substrate, the light emitted by the light-emitting elements can be prevented from leaking from lateral sides of the second substrate, thereby ensuring the display effect of the display substrate.

Figure 6:
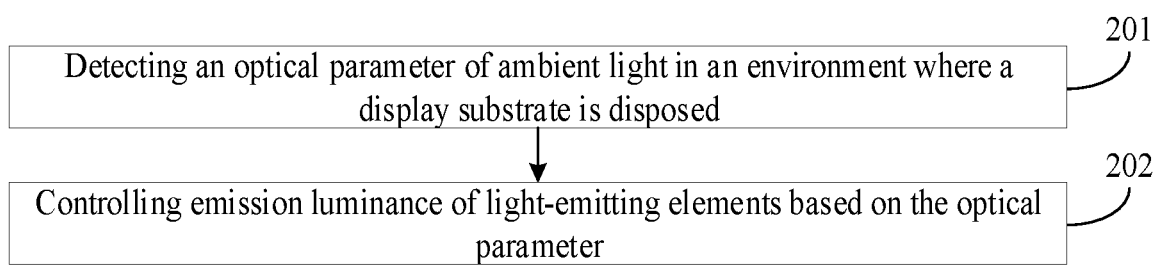
FIG. 6 is a flowchart of a control method of light-emitting elements in a display substrate according to an embodiment of the present disclosure.

FIG. 6 is a flowchart of a control method of light-emitting elements in a display substrate according to an embodiment of the present disclosure. The method may be applied to the light-emitting elements 105 in the display substrate 10 according to the embodiments described above. Referring to FIG. 6, it is can be seen that the method may include the following processes.

In process 201, the optical parameter of ambient light in an environment where the display substrate is disposed is detected.

In the embodiment of the present disclosure, the optical parameter may include at least a light intensity, and may also include a color temperature. For example, the display substrate 10 may include a detection component 106. The detection component 106 may include: at least one first sensor 1061 disposed in a peripheral region 101b and a plurality of second sensors 1062 disposed in a display region 101a. The first sensor 1061 may be configured to detect a first light intensity of the ambient light. The second sensors 1062 may be configured to detect a second light intensity and a color temperature of the ambient light.

In process 202, the emission luminance of the light-emitting elements is controlled based on the optical parameter.

In the embodiment of the present disclosure, after detecting the first light intensity of the ambient light, the first sensor 1061 may send the first light intensity to the light source control circuit, which may receive the first light intensity. After detecting the second light intensity and the color temperature of the ambient light, the second sensors 1062 may send the second light intensity and the color temperature to the light source control circuit, which may receive the second light intensity and the color temperature. Afterwards, the light source control circuit may control the emission luminance of the light-emitting elements based on the first light intensity, the second light intensity, and the color temperatures.

In summary, the embodiment of the present disclosure provides a control method of light-emitting elements in a display substrate. The method may adjust the emission luminance of the light-emitting elements based on the optical parameter of the ambient light in an environment where the display substrate is disposed. When the external ambient light is weak, the light source control circuit adjusts the emission luminance of the light-emitting elements based on the optical parameter of the ambient light detected by the detection component, thereby providing auxiliary light sources for the display substrate, such that the display substrate normally emits light to ensure the display effect.

Figure 7:
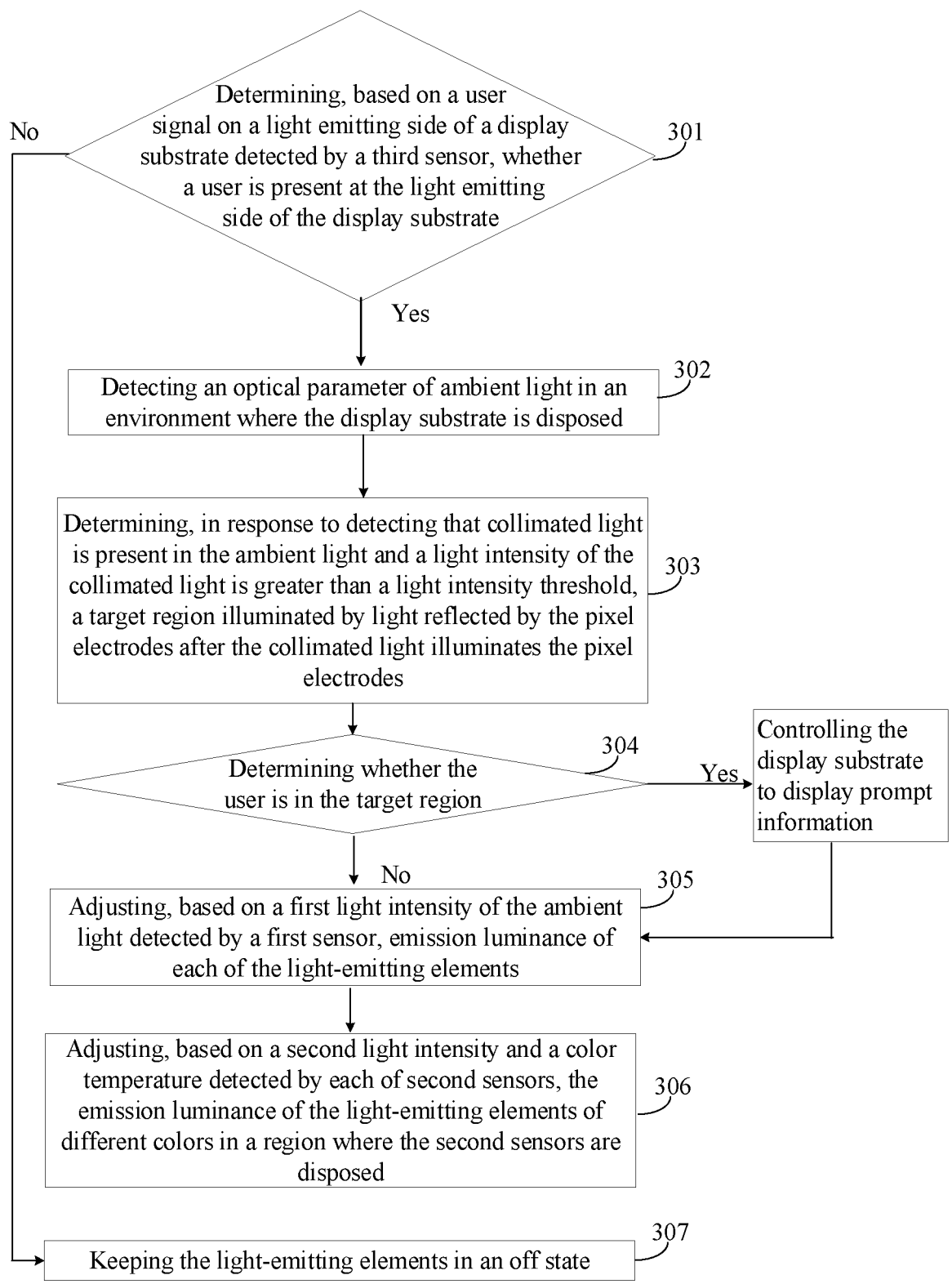
FIG. 7 is a flowchart of a control method of light-emitting elements in a display substrate according to an embodiment of the present disclosure.

FIG. 7 is a flowchart of a control method of light-emitting elements in a display substrate according to an embodiment of the present disclosure. The method may be applied to the light-emitting elements 105 in the display substrate 10 according to the embodiments described above. Referring to FIG. 7, the method may include the following processes.

In process 301, whether a user is present at a light emitting side of the display substrate is determined based on a user signal at the light emitting side of the display substrate detected by the third sensor.

In the embodiment of the present disclosure, the display substrate 10 may include a detection component 106 and a light source control circuit, wherein the detection component 106 may include: a third sensor 1063. The third sensor 1063 may be configured to detect the user signal at the light emitting side of the display substrate, and send the user signal to the light source control circuit. The light source control circuit may acquire the user signal and determine, based on the user signal, whether a user is present at the light emitting side of the display substrate.

Figure 8:
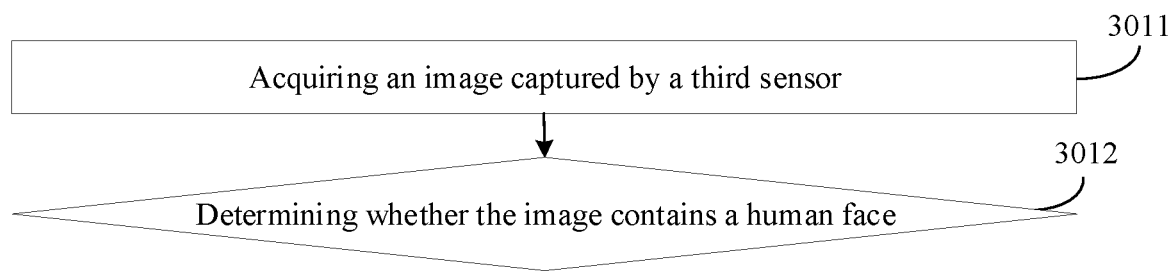
FIG. 8 is a flowchart of a method for determining whether a user is present at a light emitting side of a display substrate according to an embodiment of the present disclosure.

Optionally, in a case where the third sensor 1063 is a camera, referring to FIG. 8, process 301 may include the following sub-processes.

In sub-process 3011, an image captured by the third sensor is acquired.

In the embodiment of the present disclosure, the third sensor 1063 may be configured to capture an image at the light emitting side of the display substrate 10 and send the image to the light source control circuit. The light source control circuit may acquire the image.

In sub-process 3012, whether the image contains a human face is determined.

In the embodiment of the present disclosure, after acquiring the image sent by the third sensor 1063, the light source control circuit may analyze the image and determine whether the image contains a human face. Where the image contains a human face, the light source control circuit may determine that a user is present at the light emitting side of the display substrate 10; and where the image does not contain a human face, the light source control circuit may determine that no user is present at the light emitting side of the display substrate 10.

In process 302, the optical parameter of ambient light in an environment where the display substrate is disposed is detected.

In the embodiment of the present disclosure, light emitted by at least two of the plurality of light-emitting elements 105 in the display substrate 10 is of different colors. The optical parameter may include: a light intensity and a color temperature. The detection component 106 may include: at least one first sensor 1061 disposed in a peripheral region 101b and a plurality of second sensors 1062 disposed in a display region 101a. The first sensor 1061 may be configured to detect a first light intensity of the ambient light. The second sensors 1062 may be configured to detect a second light intensity and a color temperature of the ambient light.

After detecting the first light intensity of the ambient light, the first sensor 1061 may send the first light intensity to the light source control circuit, such that the light source control circuit adjusts the emission luminance of the light-emitting elements 105 based on the first light intensity.

After detecting the second light intensity and the color temperature of the ambient light, the second sensors 1062 may send the second light intensity and the color temperature to the light source control circuit, such that the light source control circuit may adjust, based on the second light intensity and the color temperature detected by each of the second sensors 1062, the emission luminance of the light-emitting elements 105 of different colors in the region where the second sensors 1062 are disposed.

In process 303, in response to detecting that collimated light is present in the ambient light and a light intensity of the collimated light is greater than a light intensity threshold, a target region illuminated by light reflected by the pixel electrodes after the collimated light illuminates the pixel electrodes is determined.

If the light source control circuit determines that a user is present at the light emitting side of the display substrate 10, determines that the ambient light is the collimated light based on the optical parameter sent by the detection component 106, and determines that the light intensity of the collimated light is greater than the light intensity threshold, the light source control circuit may determine the target region, wherein the target region is an region illuminated by light reflected by the pixel electrodes 104 after the collimated light illuminates the pixel electrodes 104. The target region is not appropriate for the user to view information.

If the light source control circuit determines, based on the optical parameter detected by the detection component 106, that the light intensity of the external ambient light received on a partial region of the display substrate 10 is greater than the light intensity of the external ambient light received on other regions, the light source control circuit may determine that the collimated light is present in the external ambient light received by the display substrate 10. For example, when a lighting lamp is turned on in the environment where the display substrate 10 is disposed, and an illumination direction of the lighting lamp is toward the light emitting side of the display substrate 10, the light source control circuit may determine, based on the optical parameter detected by the detection component 106, that the collimated light is present in the ambient light.

Optionally, the detection component 106 may also detect an illumination direction of the collimated light and a position of the collimated light; and after receiving the illumination direction and the position of the collimated light, the light source control circuit may calculate the target region based on the illumination direction and the position of the collimated light.

In process 304, whether the user is in the target region is determined.

In the embodiment of the present disclosure, the light source control circuit may determine whether the user is in the target region based on the determined target region and the received image sent by the third sensor 1063.

In response to determining that the user is in the target region, the light source control circuit may control the display substrate 10 to display prompt information. The prompt information may be configured to remind the user to leave the target region. After the user leaves the target region, the following process 305 is performed continuously.

In response to determining that the user is not in the target region, the following process 305 is performed directly.

In process 305, the emission luminance of each of the light-emitting elements is adjusted based on the first light intensity of the ambient light detected by the first sensor.

In the embodiment of the present disclosure, if the light source control circuit determines that a user is present at the light emitting side of the display substrate 10, the light source control circuit may adjust the emission luminance of each of the light-emitting elements 105 based on the first light intensity of the ambient light detected by the first sensor 1061, wherein the adjusted emission luminance is negatively correlated with the light intensity.

As an example, if the first light intensity detected by the first sensor 1061 is low, which means that the external ambient light is weak, the light source control circuit may control the light-emitting element 105 to emit light with a high luminance, thereby ensuring the normal display of the display substrate 10. If the first light intensity detected by the first sensor 1061 is great, which means that the external ambient light is sufficient to ensure the normal display of the display substrate 10, the light source control circuit may control the light-emitting element 105 to be in the off state, thereby reducing the power consumption.

In process 306, the emission luminance of the light-emitting elements of different colors in the region where the second sensors are disposed is adjusted based on the second light intensity and the color temperature detected by each of second sensors.

In the embodiment of the present disclosure, since the external ambient light may be collimated light, the external ambient light received by each region of the display substrate 10 is not uniform. Some regions receive strong external ambient light, and some regions receive weak external ambient light. Thus, after the light source control circuit adjusts the emission luminance of all the light-emitting elements 105 in the display substrate 10 based on the first light intensity, luminance non-uniformity may be caused between different regions in the display substrate 10, and therefore, the display effect of the display substrate 10 is poor.

Therefore, the light source control circuit may further adjust, based on the received second light intensity and the color temperature detected by each of the second sensors 1062, the emission luminance of the light-emitting elements 105 of different colors in the region where the second sensors 1062 are disposed. That is, the light source control circuit may adjust the emission luminance of the light-emitting elements 105 in different regions of the display substrate 10 based on the second light intensity and the color temperature of different regions of the display substrate 10, thereby ensuring the luminance uniformity of the display substrate 10.

In the embodiment of the present disclosure, the light source control circuit may adjust the emission luminance of the light-emitting elements 105 disposed in different regions of the display substrate 10 based on the second light intensity detected by the second sensors 1062 disposed in different regions of the display substrate 10, thereby ensuring the luminance uniformity of the display substrate 10. Moreover, the adjusted emission luminance of the light-emitting element 105 in a region is negatively correlated with the second light intensity detected by the second sensor 1062 in this region. The higher the second light intensity detected by the second sensor 1062 in a region, the lower the emission luminance of the light-emitting element 105 in this region; and the lower the second light intensity detected by the second sensor 1062 in a region, the higher the emission luminance of the light-emitting element 105 in this region.

As an example, assuming that the luminance detected by the second sensor 1062 in a region is lower than the luminance detected by the second sensors 1062 in other regions, then the light source control circuit may increase the emission luminance of the light-emitting element 105 in this region. Assuming that the luminance detected by the second sensor 1062 in a region is higher than the luminance detected by the second sensors 1062 in other regions, then the light source control circuit may decrease the emission luminance of the light-emitting element 105 in this region.

In the embodiment of the present disclosure, the light source control circuit may also adjust the emission luminance of the light-emitting elements 105 of different colors based on the color temperature of the ambient light, such that the display substrate 10 may display a more appropriate color in any external environment, thereby improving the user experience.

Optionally, for the light-emitting elements of any color in the region where each of the second sensors 1062 is disposed, when the light source control circuit adjusts the emission luminance of the light-emitting elements of any color, a component level of the light of any color in the ambient light may be determined based on the color temperature detected by the second sensor 1062, such that the emission luminance of the light-emitting element of any color can be adjusted based on the component level of the light of any color. Moreover, the adjusted emission luminance is negatively correlated with the component level of the light of any color in the ambient light. That is, the higher the component level of the light of any color in the ambient light is determined based on the color temperature, the lower the emission luminance of the light-emitting element 105 of any color is; and the lower the component level of the light of any color in the ambient light is determined based on the color temperature, the higher the emission luminance of the light-emitting element 105 of any color is.

As an example, assuming that in an external environment, a color detected by the second sensor 1062 in a region of the display substrate 10 tends to be yellow, then the light source control circuit may decrease the luminance of the light-emitting element 105 emitting yellow light in this region, and increase the luminance of the light-emitting elements 105 emitting light of other colors in this region. In another external environment, a color detected by the second sensor 1062 in a region of the display substrate 10 tends to be green, and therefore, the light source control circuit may decrease the luminance of the light-emitting element 105 emitting green light in this region, and increase the luminance of the light-emitting elements 105 emitting light of other colors in this region.

In process 307, the light-emitting elements are kept in an off state.

In the embodiment of the present disclosure, if in process 302 described above, the light source control circuit determines that no user is present at the light emitting side of the display substrate 10, which means that the user does not use the display substrate 10 to view information, the light source control circuit may control each of the light-emitting elements 105 and keep them in the off state, thereby reducing the power consumption.

It should also be noted that the order of the processes of the control method of the light-emitting elements in the display substrate according to the embodiments of the present disclosure may be appropriately adjusted, and the processes may be added or deleted as needed. For example, process 302 may be performed before process 301, and process 303, process 304, and process 306 may be deleted according to actual situations. Any variations of the method readily conceivable to any person skilled in the art in the technical scope disclosed by the present disclosure shall fall within the protection scope of the present disclosure. Therefore, a detailed description will not be repeated.

In summary, the embodiment of the present disclosure provides a control method of light-emitting elements in a display substrate. The method may adjust the emission luminance of the light-emitting elements based on the optical parameter of the ambient light in an environment where the display substrate is disposed. When the external ambient light is weak, the light source control circuit adjusts the emission luminance of the light-emitting elements based on the optical parameter of the ambient light detected by the detection component, thereby providing auxiliary light sources for the display substrate, such that the display substrate normally emits light to ensure the display effect. Moreover, when adjusting the emission luminance of the light-emitting elements, the light source control circuit may first determine whether a user is present at the light emitting side of the display substrate; in response to determining that a user is present, the light source control circuit may adjust the emission luminance of the light-emitting elements based on the optical parameter; and in response to determining that no user is present, the light source control circuit may control the light-emitting elements to be in the off state, thereby reducing power consumption.

An embodiment of the present disclosure also provides a display device. The display device may include a drive circuit and the display substrate 10 according to the embodiments described above. The drive circuit may be configured to supply drive signals to pixel circuits 110 in the display substrate 10. Moreover, the drive circuit may also be configured to supply drive signals to light-emitting circuits 111 in the display substrate 10.

Optionally, the display device may be any product or component with a display function, for example, an active matrix light-emitting diode display device, a passive matrix light-emitting diode display device, an on/off mode display device, a liquid crystal display device, a piece of electronic paper, a mobile phone, a tablet computer, a television, a display, a notebook computer, a digital photo frame or a navigator.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A display substrate, comprising:
a first substrate;
a second substrate disposed opposite to the first substrate;
a liquid crystal layer disposed between the first substrate and the second substrate;
a plurality of pixel electrodes disposed on a side, proximal to the liquid crystal player, of the first substrate; and a plurality of light-emitting elements disposed on the side, proximal to the liquid crystal layer, of the first substrate, wherein each of the plurality of light-emitting elements is disposed between two adjacent pixel electrodes, and on a same layer with the pixel electrodes, wherein the display substrate further comprises:

a first polarizing layer disposed on a side, distal from the first substrate, of the second substrate; and a second polarizing layer disposed on a side, distal from the first substrate, of the plurality of light-emitting elements, wherein the second polarizing layer comprises a plurality of polarizing patterns, an orthographic projection of each of the polarizing patterns on the first substrate covering an orthographic projection of one of the light-emitting elements on the first substrate;

wherein a polarization direction of the second polarizing layer is perpendicular to a polarization direction of the first polarizing layer.

2. The display substrate according to claim 1, further comprising:

a detection component disposed on a side, distal from the first substrate, of the second substrate, and configured to detect an optical parameter of ambient light; and a light source control circuit connected to the detection component and each of the light-emitting elements, and configured to control light emission luminance of each of the light-emitting elements based on the optical parameter.

3. The display substrate according to claim 2, wherein the optical parameter comprises a light intensity; the first substrate comprises a display region and a peripheral region surrounding the display region;

the detection component comprises:

at least one first sensor disposed in the peripheral region, wherein each of the first sensor is configured to detect a first light intensity of the ambient light; and the light source control circuit is configured to adjust the emission luminance of the light-emitting elements based on the first light intensity, wherein the adjusted emission luminance is negatively correlated with the first light intensity.

4. The display substrate according to claim 3, wherein the optical parameter further comprises a color temperature; colors of light emitted by at least two of the light-emitting elements are different;

the detection component further comprises:

a plurality of second sensors disposed in the display region, wherein each of the second sensors is configured to detect a second light intensity of the ambient light and the color temperature of the ambient light; and the light source control circuit is configured to adjust, based on the second light intensity and the color temperature detected by each of the second sensors, the emission luminance of the light-emitting elements of different colors in a region where the second sensors are disposed.

5. The display substrate according to claim 2, wherein the detection component is further configured to detect a user signal on a light emitting side of the display substrate; and the light source control circuit is configured to control, based on the optical parameter, the emission luminance of each of the light-emitting elements in response to determining that a user is present at the light emitting side of the display substrate based on the user signal.

6. The display substrate according to claim 5, wherein the first substrate comprises a display region and a peripheral region surrounding the display region; and the detection component comprises: a third sensor, wherein the third sensor is disposed in the peripheral region.

7. The display substrate according to claim 1, wherein at least two of the plurality of light-emitting elements emit light of different colors; and the display substrate further comprises:

a color filter layer, wherein the color filter layer is disposed on a side, proximal to the first substrate, of the second substrate, the color filter layer comprises a plurality of color resist blocks of different colors; an orthographic projection of each of the light-emitting elements on the first substrate is within an orthographic projection of one corresponding color resist block on the first substrate; and a color of light emitted by each of the light-emitting elements is the same as a color of the corresponding color resist block.

8. The display substrate according to claim 1, wherein an orthographic projection of each of the light-emitting elements on the first substrate is not overlapped with an orthographic projection of any one of the pixel electrodes on the first substrate.

9. The display substrate according to claim 1, wherein each of the light-emitting elements is a micro light emitting diode.

10. The display substrate according to claim 1, wherein each of the pixel electrodes is a reflective electrode.

11. The display substrate according to claim 1, further comprising:

a plurality of pixel circuits disposed on the first substrate, wherein each of the pixel circuits is connected to one of the pixel electrodes to supply a drive signal to the pixel electrode; and an orthographic projection of each of the pixel circuits on the first substrate is within an orthographic projection of a pixel electrode connected thereto on the first substrate.

12. A control method of light-emitting elements in a display substrate, wherein the display substrate comprises: a first substrate; a second substrate disposed opposite to the first substrate; a liquid crystal layer disposed between the first substrate and the second substrate; a plurality of pixel electrodes disposed on a side, proximal to the liquid crystal player, of the first substrate; and a plurality of light-emitting elements disposed on the side, proximal to the liquid crystal layer, of the first substrate; and the method comprises:

detecting an optical parameter of ambient light in an environment where the display substrate is disposed; and controlling emission luminance of the light-emitting elements based on the optical parameter, wherein each of the plurality of light-emitting elements is disposed between two adjacent pixel electrodes, and on a same layer with the pixel electrodes, wherein the display substrate further comprises:

a first polarizing layer disposed on a side, distal from the first substrate, of the second substrate; and a second polarizing layer disposed on a side, distal from the first substrate, of the plurality of light-emitting elements, wherein the second polarizing layer comprises a plurality of polarizing patterns, an orthographic projection of each of the polarizing patterns on the first substrate covering an orthographic projection of one of the light-emitting elements on the first substrate;

wherein a polarization direction of the second polarizing layer is perpendicular to a polarization direction of the first polarizing layer.

13. The method according to claim 12, wherein the optical parameter comprises a light intensity; the display substrate comprises a first sensor; and controlling the emission luminance of the light-emitting elements based on the optical parameter comprises:
   adjusting, based on a first light intensity of the ambient light detected by the first sensor, the emission luminance of the light-emitting elements in response to determining that a user is present at a light emitting side of the display substrate, wherein the adjusted emission luminance is negatively correlated with the first light intensity; and
   keeping the light-emitting elements in an off state in response to determining that no user is present at the light emitting side of the display substrate.

14. The method according to claim 13, wherein the optical parameter further comprises a color temperature; the display substrate further comprises a plurality of second sensors disposed in a display region; and
   controlling the emission luminance of the light-emitting elements based on the optical parameter further comprises:
   adjusting, based on a second light intensity and the color temperature detected by each of the second sensors, the emission luminance of the light-emitting elements of different colors in a region where the second sensors are disposed.

15. The method according to claim 13, wherein the display substrate further comprises a third sensor; and the method further comprises:
   determining, based on a user signal at the light emitting side of the display substrate detected by the third sensor, whether a user is present at the light emitting side of the display substrate.

16. The method according to claim 15, wherein in response to the third sensor being a camera, determining, based on the user signal at the light emitting side of the display substrate detected by the third sensor, whether a user is present at the light emitting side of the display substrate comprises:
   acquiring an image captured by the third sensor;
   determining, in response to the image containing a human face, that a user is present at the light emitting side of the display substrate; and
   determining, in response to the image not containing a human face, that no user is present at the light emitting side of the display substrate.

17. The method according to claim 13, wherein in response to determining that a user is present at the light emitting side of the display substrate, the method further comprises:

determining, in response to detecting that collimated light is present in the ambient light and a light intensity of the collimated light is greater than a light intensity threshold, a target region illuminated by light reflected by the pixel electrodes after the collimated light illuminates the pixel electrodes; and
   controlling, in response to determining that the user is present in the target region, the display substrate to display prompt information, wherein the prompt information is intended to remind the user to leave the target region.

18. A display device, comprising: a drive circuit, and a display substrate, wherein
   the display substrate comprises a first substrate; a second substrate disposed opposite to the first substrate; a liquid crystal layer disposed between the first substrate and the second substrate; a plurality of pixel electrodes disposed on a side, proximal to the liquid crystal player, of the first substrate; and a plurality of light-emitting elements disposed on the side, proximal to the liquid crystal layer, of the first substrate; and
   the drive circuit is configured to supply a drive signal for a pixel circuit in the display substrate,
   wherein each of the plurality of light-emitting elements is disposed between two adjacent pixel electrodes, and on a same layer with the pixel electrodes,
   wherein the display substrate further comprises:
   a first polarizing layer disposed on a side, distal from the first substrate, of the second substrate; and
   a second polarizing layer disposed on a side, distal from the first substrate, of the plurality of light-emitting elements, wherein the second polarizing layer comprises a plurality of polarizing patterns, an orthographic projection of each of the polarizing patterns on the first substrate covering an orthographic projection of one of the light-emitting elements on the first substrate;
   wherein a polarization direction of the second polarizing layer is perpendicular to a polarization direction of the first polarizing layer.

19. The device according to claim 18, wherein the display substrate further comprises:
   a detection component disposed on a side, distal from the first substrate, of the second substrate, and configured to detect an optical parameter of ambient light; and
   a light source control circuit connected to the detection component and each of the light-emitting elements, and configured to control light emission luminance of each of the light-emitting elements based on the optical parameter.

* * * * *